Patented Mar. 24, 1953

2,632,732

UNITED STATES PATENT OFFICE 2,632,732

DISPOSAL OF CAUSTIC WASTE LIQUOR FROM TEXTILE INDUSTRY

William Reginald Steele, Camillus, and John Vincent McMahon, Syracuse, N. Y., assignors to Allied Chemical and Dye Corporation, New York, N. Y., a corporation of New York No Drawing. Application October 9, 1948, Serial No. 53,766

5 Claims. (Cl. 210—2)

This invention relates to the treatment of caustic waste liquor containing organic matter and more particularly refers to a new and improved method of disposal of caustic waste liquor from the textile industry.

Most cotton textile fibers require some form of preparatory treatment to remove natural impurities consisting of oils, natural waxes and pectin materials as well as varying amounts of dirt adhering to the fibers. In the manufacture of textiles the fibers are frequently subjected to boiling operations in caustic solutions. The treatment of fibers, whether preparatory or during the manufacturing operation, with sodium or potassium hydroxide solutions results in a problem of caustic waste disposal, a problem which is becoming more acute due to the higher consumption of caustic and increased governmental legislation prohibiting the discharge of waste liquor into bodies of water. Caustic waste liquors from the textile industry often contain a high percentage of caustic ranging up to 6½% with a pH value in excess of 12 and are contaminated with various insoluble organic impurities. In addition, they have a dark brown color and a bad odor quite often phenolic in nature. These strongly caustic waste liquors are most difficult to purify.

From time to time various methods of disposing of the waste liquor have been proposed but none has proven to be sufficiently practical to result in common adoption. Perhaps the oldest method of disposal of textile waste consists in discharging it into an earthen reservoir, allowing evaporation and seepage to occur and then discharging the residue into a stream. Another method proposes treatment with combustion gases to reduce the pH value followed by treatment with calcium chloride to precipitate carbonates. This procedure is not only costly but also does not remove the objectionable odor from the liquor and results in the formation of a substantial precipitate. The treatment of waste liquor with chlorine gas or sodium hypochlorite to oxidize the organic material has also been suggested but it fails to satisfactorily purify the waste liquor.

A primary object of the present invention is to provide a simple, inexpensive method for rendering caustic textile waste liquor harmless to digestive micro organisms when delivered to sewage plants or other useful aquatic life when discharged directly into streams.

We have discovered that strongly caustic wastes from textile mills can be rendered relatively harmless with reasonable economy by treating the liquor first with carbon dioxide or combustion flue gas to substantially neutralize caustic and lower the pH value and second with chlorine gas to oxidize organic impurities such as cellulose derivatives, cotton impurities, wetting agent and the like, thereby improving odor and color and solubilizing precipitates. After treatment with carbon dioxide and chlorine, we prefer to dilute with water to dissolve slight residual precipitate and further improve color.

Preferably the waste liquor is treated with sufficient carbon dioxide during the carbonation stage to reduce the pH value of the liquor from above 12 to within the range of 9.5 to 5.0. The amount of carbon dioxide required to reduce the pH value of caustic waste liquor will depend upon the concentration of caustic in the liquor. Waste containing 6½% sodium hydroxide usually requires 35 to 40 pounds carbon dioxide per 100 gallons waste; waste containing 1% sodium hydroxide requires about 5 to 6 pounds carbon dioxide per 100 gallons waste liquor.

The quantity of chlorine required for oxidation of cellulose derivatives, cotton impurities and other organic materials in the waste liquor likewise depends upon the quantity and nature of these organic materials. Chlorine ranging up to 5 pounds per 100 gallons of waste will usually be found sufficient to satisfactorily improve color and odor of the liquor. A small excess of available chlorine in the waste liquor is preferred. Preferably the amount of chlorine employed in the chlorination stage is sufficient to reduce the pH value of the liquor from within the range of 9.5 to 5.0 to within the range of 8.0 to 5.0.

In some instances a slight precipitate results after treatment with carbon dioxide and chlorine gas in accordance with the present invention. Dilution with, for example, 9 parts by weight of water will ordinarily dissolve this precipitate and further improve the color and odor as well as reduce percentage of excess chlorine in the waste liquor.

In the practice of our invention any conventional method of carbonating waste liquor may be employed as, for example, simply bubbling carbon dioxide gas through a body of liquor. Pure carbon dioxide gas or mixtures containing high concentrations of carbon dioxide are not required; combustion flue gas containing as low as 10% carbon dioxide will satisfactorily neutralize caustic in the liquor. Efficient contact between waste liquor and carbon dioxide may be achieved by flowing the liquor down through the top of a vessel packed with coke countercurrent to an upwardly rising stream of carbon dioxide or flue gas. The waste liquor may be recirculated several times to the coke tower until it is sufficiently saturated with carbon dioxide. The same or a second similar vessel may be employed for effecting chlorination of the carbonated waste liquor.

The following illustrates the results obtainable by prior art methods of treating waste caustic liquor; in conducting these tests, waste caustic liquor from dialysis of mercerizing caustic having the following characteristics was employed:

Table I

| | |
|---|---|
| Caustic soda, NaOH per cent | 6.5 |
| Organic impurities do | 0.8 |
| pH value at room temperature | 13.0 |
| Color | Muddy amber |
| Odor | Phenolic |
| Insolubles | Present |

This waste was first saturated with carbon dioxide and its alkalinity, odor, color and precipitate formed were determined. The pH value at room temperature was 8.4; the odor—pronounced phenolic; color—reddish brown; and precipitate—substantial.

To the carbonated waste 20 grams per liter calcium chloride was added and the above determinations repeated. The pH value at room temperature was 8.3, odor—pronounced phenolic; color—water white; precipitate—substantial. Thus, carbonation alone reduced the pH value to 8.4 but the waste continued to have a phenolic odor, dark color and precipitate. Carbonation followed by treatment with calcium chloride satisfactorily reduced the pH value to 8.3 and improved the color but the bad odor and precipitate which result from the treatment are objectionable.

A second series of tests were conducted to determine the effect of treating waste liquor with sodium hypochlorite; and in one instance followed by treatment with carbon dioxide and dilution with water. The waste was treated with increasing quantities of sodium hypochlorite as shown in columns 1, 2 and 3 of Table II.

From the above table it will be noted that sodium hypochlorite did not effectively improve odor or color. Subsequent treatment with carbon dioxide reduced the pH satisfactorily but the odor and color were unsatisfactory.

The following examples illustrate several methods for practicing the process in accordance with the present invention:

*Example 1.*—Waste liquor having the composition given in Table I was first treated by bubbling 37 pounds carbon dioxide per 100 gallons waste into a body of waste liquor. After carbonation the pH of the liquor was reduced to 9.1. The liquor containing a precipitate was filtered and the filtrate produced therefrom had a phenolic odor and a light yellow color. Approximately 1.2 pounds precipitate per 100 gallons waste was separated. The composition of the precipitate was about 18% organic material and about 82% inorganic matter containing predominantly silicates of Fe, Al, Ca and Mg.

Three and one-half pounds of chlorine were added to each 100 gallons filtrate. The chlorinated filtrate contained 0.4% available chlorine, was odorless, had a light yellow color and contained a trace of precipitate.

The chlorinated filtrate was diluted with 9 parts by volume of water resulting in a mixture which had a pH value of 9.0, 0.02% excess available chlorine, no odor, a faint yellow color and a slight precipitate. The phenolic color did not appear after aeration or neutralization with sodium thiosulfate. Thus, the above treatment effectively eliminated the odor and color, reduced alkalinity and minimized precipitation in the caustic waste liquor.

*Example 2.*—Another portion of waste liquor was treated in a manner identical with that of Example 1 except that a smaller amount of chlorine, namely 2.4 pounds per 100 gallons waste, was added in the second stage. The treated waste liquor had a pH value of 9.4, 0.02% excess available chlorine, no odor, a faint yellow color and slight precipitate.

*Example 3.*—Three separate portions of caustic waste liquor having the characteristics shown in Table I were first carbonated, subsequently chlorinated without filtration and finally diluted with water. The primary distinction between the three examples, the data of which is given

Table II

| | 1 | 2 | 3 |
|---|---|---|---|
| Treatment with Sodium Hypochlorite: | | | |
|   Available Chlorine added, percent approx. | 0.10 | 0.25 | 0.50 |
|   Available Chlorine residual, percent approx. | | 0.10 | 0.30 |
|   pH Value after NaOCl treatment. | 11.5 | 11.5 | 11.5 |
|   Odor | Phenolic | Phenolic | Phenolic. |
|   Color | Yellow | Yellow | Yellow. |
| Saturation with Carbon Dioxide: | | | |
|   Available Chlorine, residual, percent approx. | | | None. |
|   pH Value after Carbonation | | | 7.9. |
|   Odor | | | Phenolic. |
|   Color | | | Reddish brown. |
| Dilution with Water: | | | |
|   pH Value after Dilution | | | 8.3. |
|   Odor | | | Phenolic. |
|   Color | | | Reddish brown. | in columns 1, 2 and 3 of Table III, is the use of varying amounts of chlorine.

*Table III*

|  | 1 | 2 | 3 |
|---|---|---|---|
| Carbonation: |  |  |  |
|   $CO_2$ added to reduce pH to | 9.1 | 9.1 | 9.1. |
|   $CO_2$ added, lb./100 gal. waste | 37 | 37 | 37. |
|   Odor | Phenolic | Phenolic | Phenolic. |
|   Color | Reddish Brown | Reddish Brown | Reddish Brown. |
| Chlorination: |  |  |  |
|   $Cl_2$ added to produce, percent excess | 0.02 | 0.2 | 0.8. |
|   pH value | 9.1 | 9.0 | 8.8. |
|   Odor | Odorless | Odorless | Odorless. |
|   Color | Yellow | Faint yellow | Very faint yellow. |
|   Precipitate | Slight | Slight | Slight. |
| Dilution with water: |  |  |  |
|   Available chlorine, percent excess | None | None | 0.2. |
|   pH value | 9.5 | 9.4 | 9.4. |
|   Odor | None | None | None. |
|   Color | Light yellow | Faint yellow | Water white. |

In all cases the treated waste liquor was satisfactory with respect to pH value, odor, color and amount of precipitate.

the operation of the process when conducted in a continuous manner. Into the top of a tower packed with coke, waste liquor flowed countercurrent in intimate contact with a stream of flue gas rising upwardly from the bottom of the tower. The liquid collected in the bottom of the tower was subjected to repeated carbonations. After carbonation, the waste liquor was subjected to two chlorinations in a coke tower. For the purposes of fully illustrating the effects of treating with carbon dioxide and chlorine, data during the operation are tabulated below in Table V.

*Table V.—Continuous treatment*

|  | First Stage | Second Stage | Third Stage | Fourth Stage |
|---|---|---|---|---|
| Carbonation: |  |  |  |  |
|   Carbonation Time, Min | 20 | 5 | 18 | 7. |
|   pH, Start Carbonation | 13.0 | 10.1 | 9.5 | 8.7. |
|   pH, End Carbonation | 10.1 | 9.5 | 8.7 | 8.4. |
|   Odor | Phenolic | Phenolic | Phenolic | Phenolic. |
|   Color | Light Brown | Light Brown | Light Brown | Yellow. |
|   Precipitate Formed (Accumulative) | Small Quantity | Little more than 1st Stage. | Same as 2d Stage | Heavy. |

|  | Fifth Stage | Sixth Stage |
|---|---|---|
| Chlorination After Fourth Stage Carbonation: |  |  |
|   Chlorination Time, Min | 5 | 5. |
|   pH, Start Chlorination | 8.4 | 7.6. |
|   pH, End Chlorination | 7.6 | 5.4. |
|   Odor | Faint Chlorine (No Phenol Odor) | Strong Chlorine (No Phenol Odor). |
|   Color | Water White | Light Yellow. |
|   Precipitate | Small Quantity | Small Quantity. |

*Example 4.*—To a batch of caustic waste liquor, carbon dioxide gas was introduced in a series of three consecutive stages. At the end of each stage the pH, odor, color and precipitate formed were noted. The carbonated waste liquor was then treated with chlorine in two stages and similar data recorded. The results of this operation are tabulated in Table IV below:

*Table IV.—Batch operation*

|  | First Stage | Second Stage | Third Stage |
|---|---|---|---|
| Carbonation: |  |  |  |
|   Carbonation Time, Min | 3 | 15 | 25. |
|   pH, Start Carbonation | 13.0 | 10.3 | 9.2. |
|   pH, End Carbonation | 10.3 | 9.2 | 7.9. |
|   Odor |  | Faint Phenolic | Strong Phenolic | Faint Phenolic. |
|   Color | Light Brown | Light Brown | Yellow. |
|   Precipitate Formed (Accumulative) | Small Quantity | Same as in First Stage. | Very Heavy. |

|  | Fourth Stage | Fifth Stage |
|---|---|---|
| Chlorination After Third Stage Carbonation: |  |  |
|   Chlorination Time, Min | 5 | 5. |
|   pH, Start Chlorination | 7.9 | 7.5. |
|   pH, End Chlorination | 7.5 | 5.8. |
|   Odor | Faint Chlorine (No Phenolic Odor). | Strong Chlorine (No Phenolic Odor). |
|   Color | Water White | Light Yellow. |
|   Precipitate | Very Little | Small Quantity. |

From the above the effect of using varying quantities of carbon dioxide and chlorine, particularly with respect to the pH of the treated liquor, may be observed.

*Example 5.*—The following example illustrates

It is important in the practice of this invention to treat the waste liquor first with carbon dioxide and subsequently with chlorine. If the procedure be reversed the treated waste liquor is unsatisfactory with respect to odor and color. The results when reversing the order of treatment are illustrated in Table VI below:

Table VI

|  | 1 | 2 |
|---|---|---|
| Treatment with Chlorine: | | |
| Available Chlorine to produce, percent Excess. | 0.4 | 1.25. |
| Odor | Slight | Slight. |
| Color | Yellow | Light Yellow. |
| Precipitate | Yes | Yes. |
| Dilution with Water: | | |
| Available Chlorine | | 0.1 |
| pH Value | | 12.0. |
| Odor | None | None. |
| Color | Very Light Yellow | Very Light Yellow. |
| Saturation with Carbon Dioxide: | | |
| Available Chlorine, percent | None | 0.30. |
| pH Value | 9.1 | 8.8. |
| Odor | Phenolic | Phenolic. |
| Color | Reddish Brown | Reddish Brown. |

Although certain preferred embodiments of the invention have been disclosed for purposes of illustration, it will be evident that various changes and modifications may be made therein without departing from the scope and spirit of the invention which is not to be limited save as defined in the appended claims.

We claim:

1. A process for treating waste liquor from textile treatment containing 1 to 6½% caustic, organic matter and having a phenolic odor which comprises adding 5 to 40 pounds carbon dioxide per 100 gallons waste liquor to the waste liquor, and subsequently adding to the carbonated waste liquor an amount of chlorine sufficient to substantially destroy the phenolic odor, not in excess of 5 pounds chlorine per 100 gallons waste liquor, and to provide a small excess of available chlorine in the waste liquor.

2. A process for treating waste liquor from textile treatment containing 1 to 6½% caustic, organic matter and having a phenolic odor which comprises adding 5 to 40 pounds carbon dioxide per 100 gallons waste liquor to the waste liquor, subsequently adding to the carbonated waste liquor an amount of chlorine sufficient to substantially destroy the phenolic odor, not in excess of 5 pounds chlorine per 100 gallons waste liquor, and to provide a small excess of available chlorine in the waste liquor, and diluting the chlorinated waste liquor with at least 9 parts by weight of water for each part of liquor.

3. A process for treating waste liquor from textile treatment containing 1 to 6½% caustic, organic matter and having a phenolic odor which comprises admixing flue gas with the waste liquor in an amount equivalent to 5 to 40 pounds carbon dioxide per 100 gallons waste liquor, subsequently adding to the carbonated waste liquor an amount of chlorine sufficient to substantially destroy the phenolic odor, not in excess of 5 pounds chlorine per 100 gallons waste liquor, and to provide a small excess of available chlorine in the waste liquor, and diluting the chlorinated waste liquor with at least 9 parts by weight of water for each part of liquor.

4. A process for neutralizing and improving the color and odor of waste caustic liquor from textile treatment having a phenolic odor and containing up to 6½% of caustic soda which comprises intimately contacting the liquor with gas containing carbon dioxide until the pH value of the liquor is reduced from above 12 to within the range of 9.5 to 5.0, then treating the liquor with an amount of chlorine sufficient to substantially destroy the phenolic odor, not in excess of 5 pounds chlorine per 100 gallons waste liquor, and to provide a small excess of available chlorine in the waste liquor.

5. A process as defined in claim 4 comprising the further step of diluting the liquor after the chlorine treatment with sufficient water to dissolve substantially all precipitated material therein.

WILLIAM REGINALD STEELE.
JOHN VINCENT McMAHON.

REFERENCES CITED

The following references are of record in the file of this patent:

UNITED STATES PATENTS

| Number | Name | Date |
|---|---|---|
| 1,303,177 | Drewson | May 6, 1919 |
| 1,567,395 | Schmidt | Dec. 29, 1925 |
| 1,802,806 | Curtis et al. | Apr. 28, 1931 |
| 1,900,995 | Nichols | Mar. 14, 1933 |
| 2,120,634 | Stevenson | June 14, 1938 |
| 2,200,784 | Wallace | May 14, 1940 |
| 2,282,112 | Bergstrom et al. | May 5, 1942 |
| 2,418,981 | Muller | Apr. 15, 1947 |

OTHER REFERENCES

Steel, Water Supply and Sewerage, 2nd edition, 1947, pages 306, 307 and 481.